(12) United States Patent
Yang et al.

(10) Patent No.: US 10,888,068 B2
(45) Date of Patent: Jan. 12, 2021

(54) ADJUSTABLE HOLLOW FOOD-LEAKING TOY

(71) Applicant: ZHUHAI HENGQIN SUPER TECHNOLOGY LTD., Guangdong (CN)

(72) Inventors: Tianle Yang, Guangdong (CN); Yibao Zeng, Guangdong (CN)

(73) Assignee: ZHUHAI HENGQIN SUPER TECHNOLOGY LTD., Zhuhai (CN)

( * ) Notice: Subject to any disclaimer, the term of this patent is extended or adjusted under 35 U.S.C. 154(b) by 300 days.

(21) Appl. No.: 15/964,046

(22) Filed: Apr. 26, 2018

(65) Prior Publication Data

US 2019/0289824 A1 Sep. 26, 2019

(30) Foreign Application Priority Data

Mar. 22, 2018 (CN) .................... 2018 2 0400989 U (51) Int. Cl.
*A01K 15/02* (2006.01)
*A01K 5/02* (2006.01)
*A01K 5/01* (2006.01)

(52) U.S. Cl.
CPC .......... *A01K 15/026* (2013.01); *A01K 5/0114* (2013.01); *A01K 5/02* (2013.01)

(58) Field of Classification Search
CPC .. A01K 15/026; A01K 5/0114; A01K 5/0233; A01K 5/02; A01K 15/025
See application file for complete search history.

(56) References Cited

U.S. PATENT DOCUMENTS

| | | | | |
|---|---|---|---|---|
| 7,600,488 | B2* | 10/2009 | Mann .................... | A01K 15/026 119/710 |
| 8,474,404 | B2* | 7/2013 | Costello ............... | A01K 15/025 119/51.01 |
| 2006/0213454 | A1* | 9/2006 | Wolfe, Jr. ............ | A01K 5/0114 119/709 |
| 2010/0186682 | A1* | 7/2010 | Myers, Jr. ............ | A01K 15/026 119/709 |
| 2012/0318210 | A1* | 12/2012 | Anderson ............ | A01K 5/0114 119/710 |
| 2013/0055965 | A1* | 3/2013 | Valle .................... | A01K 15/025 119/710 |
| 2016/0235035 | A1* | 8/2016 | Ma ........................ | A01K 5/0225 |
| 2018/0098524 | A1* | 4/2018 | Zhang .................... | F21V 15/01 |
| 2019/0021286 | A1* | 1/2019 | Baker ................... | A01K 5/0114 |
| 2019/0133082 | A1* | 5/2019 | Becattini, Jr. ........ | A01K 15/026 |

* cited by examiner

*Primary Examiner* — Magdalena Topolski
*Assistant Examiner* — Katelyn T Truong (57) ABSTRACT

Provided is an adjustable hollow food-leaking toy. The adjustable hollow food-leaking toy includes a housing and an inner container; the inner container is a hollow shell made of a hard material; a food eaten by a pet is accommodated in the inner container; a window configured to leak the pet food is formed on the sidewall of the inner container; the window can be switched between a sealed state and a non-sealed state. The housing is a hollow shell; the inner container is held in the housing; a space for moving the pet food is provided between the housing and the inner container; and multiple food-leaking holes for leaking the pet food are formed on the sidewall of the housing.

6 Claims, 8 Drawing Sheets

ADJUSTABLE HOLLOW FOOD-LEAKING TOY

CROSS REFERENCES TO RELATED APPLICATION

This application claims priority of Chinese Utility Model Application No. 201820400989.9 filed on Mar. 22, 2018, the entire contents of which are hereby incorporated by reference.

TECHNICAL FIELD

The disclosure relates to the technical field of pet toys, and more particularly, to an adjustable hollow food-leaking toy.

BACKGROUND

Currently, there are many types of pet toys on a market. Most of the toys can be combined with food and have a food feeding function. Such types of the toys generally are called as food-leaking toys. The food-leaking toys not only are a simple toy through which the loneliness is mediated, but also can prolong an eating time of a pet and prolong a half hour of an eating activity in usual to several hours. During eating, the pet may get a certain exercises. However, the existing food-leaking toys on the current market have the problems that the function is relatively single and the attraction to the pet is not enough, etc.

SUMMARY

In view of this, the disclosure provides a pet food-leaking toy which is more attractive and more functional. The objectives of the disclosure are implemented by the following technical solutions.

An adjustable pet food-leaking toy comprises a housing and an inner container.

The inner container is a hollow shell made of a hard material and is configured to accommodate a food eaten by a pet.

A window configured to leak the pet food is formed on the sidewall of the inner container; the opening degree of the window can be adjusted.

The housing is a hollow shell and is configured to hold the inner container; a space for moving the pet food is provided between the housing and the inner container; and food-leaking holes for leaking the pet food are formed on the sidewall of the housing.

Preferably, a food eating hole is respectively formed at two ends of the inner container.

A locating pipe communicating with a cavity of the inner container via each of the food eating holes is further respectively arranged at the two ends of the inner container; specifically, raised ribs arranged at the periphery of an opening of the inner container are adopted.

A food feeding hole is respectively formed at two ends of the housing.

A limiting pipe communicating with each of the food feeding holes is further respectively arranged at the two ends of the housing; specifically, raised fillets are adopted; the fillets of the housing and the raised ribs of the inner container are matched and sleeve correspondingly, such that the inner container and the housing are correspondingly fixed.

A flexible baffle piece is covered on each of the two food feeding holes on the housing; each of the flexible baffle pieces is further provided with a food feeding port configured to feed the food to each of the locating pipes; preferably, the flexible baffle pieces are of a funnel shape, such that the food is supplied more easily and the food is not leaked easily.

Preferably, the inner container consists of an upper inner container and a lower inner container buckled oppositely; the upper inner container and the lower inner container are formed into a whole via ultrasonic welding, buckling or screw connecting; or in a same embodiment, the housing consists of an upper housing and a lower housing that are buckled and are connected mutually; specifically, a splicing connection manner may be adopted.

Preferably, the window is arranged at a junction of the upper and lower inner containers and is spliced by edge gaps of the upper and lower inner containers; a circle of groove positions composed of the fillets is arranged at the periphery of the window; toothed fillets are arranged on the groove positions; an adjustment baffle plate configured to adjust the opening size of the window is inserted into the groove positions; one end of the adjustment baffle plate is provided with a convex rib; the convex rib is matched with the toothed fillets in a concave-convex manner to form a shift; the other end of the adjustment baffle plate is provided with a raised handle; the handle has the action of being stressed better and making more comfortable in adjustment; the opening size of the window is adjusted by pushing the adjustment baffle plate left and right via the handle; the size of the window directly affects the complexity and the speed at which the food is dropped off.

Preferably, multiple raised tooth grinding particles are arranged on the surface of the housing.

Preferably, the upper and lower housings are formed into a whole by adhesion.

Preferably, the inner container is of a spherical shape overall in general, and also may be of a cylindrical shape, a polyhedral shape and the like; generally, the housing is of the spherical shape or some shape convenient for rolling.

Preferably, the housing is a light pervious body, or both the inner container and the housing are the light pervious bodies.

To sum up, the pet toy provided by the disclosure can excite the pet in visual, auditory and olfactory aspects, such that the pet is more interested in it.

In a visual aspect, the inner container can be made of a transparent plastic; the housing also can be made to be transparent; in such a way, the pet can see the food inside the inner container.

In an auditory aspect, since the inner container is made of the hard plastic, when the toy is rolled, the food inside contacts the wall of the inner container to generate a sound.

In an olfactory aspect, the inner container is provided with the food-leaking window, the upper and lower ends of the inner container are penetrated through each other and the housing is provided with multiple through holes, so the smell of the food can be given off via the multiple holes.

In addition, the toy further has the following advantages: as the housing is made of an elastic material and has certain elasticity, a pet owner can throw out the toy from a certain height and the toy forms elastic jumping on the ground, thereby achieving better interaction with the pet. Furthermore, the elastic material has a good sense of touch, so the pet has better experience when playing and no damage is caused to the pet. The food-leaking speed and the complexity are adjustable, and the pet owner can adjust the toy to adapt to different pets or different stages of the pet. When the pet owner goes out for a relatively long time, the window can be adjusted to be smaller, the food inside is not consumed so quickly and the pet may play longer.

BRIEF DESCRIPTION OF THE DRAWINGS

For a better understanding of the technical solutions in the embodiments of the disclosure, the accompanying drawings for illustrating the embodiments are briefly described below. Apparently, the accompanying drawings in the following description illustrate only some embodiments of the disclosure, and persons of ordinary skill in the art may derive other accompanying drawings based on these accompanying drawings without any creative efforts.

In the drawings.

1. a housing; 2. an inner container; 3. a food-leaking hole; 4. a food eating hole; 5. a raised rib/locating pipe; 6. a food feeding hole; 7. a raised fillet/limiting pipe; 8. a baffle piece; 9. a food feeding port; 10. an adjustment baffle plate; 11. an upper inner container; 12. an upper gap; 13. a lower inner container; 14. a lower gap; 15. a window; 16. an upper groove; 17. a lower groove; 18. a convex rib; 19. a toothed fillet; 20. a handle; 21. a heating plate; 22. an upper shell; 23. a lower shell; 24. an upper mould; 25. a lower mould; 26. a hole.

DETAILED DESCRIPTION

To make the objectives, characteristics and advantages of the disclosure more obvious and understandable, the technical solutions of the disclosure will be illustrated in detail with reference to the accompanying drawings and specific embodiments. It is to be noted that the described embodiments are a part rather than all of the embodiments of the disclosure. All other embodiments obtained by a person of ordinary skill in the art based on the embodiments of the disclosure without creative efforts shall fall within the protection scope of the disclosure.

It is to be noted that direction or position relationship indicated by terms "top", "bottom" and the like is the direction or position relationship indicated by the accompanying drawings. It is only intended to describe the disclosure conveniently and simplify the description, but not indicate or imply that the indicated device or component must have the special direction, and construct and operate at the special direction. Therefore, such relationship cannot be understood as the limitation of the disclosure.

Terms "first", "second" and "third" are only used to describe, rather than to understand as indication or implication of importance or to imply the number of the indicated technical characteristics. Therefore, the characteristics defined by "first", "second" and "third" may explicitly or implicitly include one or more of the characteristics. In the description of the disclosure, unless otherwise noted, "one group" means two or more.

Embodiment

As shown in FIGS. 1-8, the embodiment provides an adjustable hollow food-leaking toy, which includes a housing 1 and an inner container 2.

The inner container 2 is a hollow shell made of a hard material; and a food to be eaten by a pet is accommodated in the inner container 2.

A window 15 configured to leak the pet food is arranged on the sidewall of the inner container 2; the window 15 can be switched between a sealed state and a non-sealed state, that is, the opening degree of the window can be adjusted.

The housing 1 is a hollow shell; the inner container 2 is held in the housing 1; a space for moving the pet food is provided between the housing 1 and the inner container 2; and multiple food-leaking holes 3 for leaking the pet food are formed on the sidewall of the housing 1.

In the process when the hollow food-leaking toy provided by the disclosure rolls, the food in the inner container 2 is leaked via the window, then is moved away in the space between the housing 1 and the inner container 2 and is leaked from the food-leaking holes 3 of the housing 1 to be eaten by the pet. The disclosure can excite the pet from auditory and olfactory aspects. First of all, in the auditory aspect, since the inner container 2 is made of the hard plastic, when the toy is rolled, the food inside the inner container 2 is collided with the inner wall of the inner container 2 to generate a sound. Then, in the olfactory aspect, the smell of the food in the inner container 2 can be given off sequentially via the window of the inner container 2 and the food-leaking holes 3 of the housing 1 such that the pet is more interested in the toy.

As an optimized solution, a food eating hole 4 is respectively formed at two ends of the inner container 2; a raised rib 5 communicating with the cavity of the inner container 2 via each of the food eating holes 4 is further arranged at the periphery of each of the food eating holes 4; a food feeding hole 6 is respectively formed at two ends of the sidewall of the housing 1; a raised fillet 7 communicating with each of the food feeding holes 6 is further respectively formed at two ends of the inner wall of the housing 1; the fillets 7 of the housing 1 and the raised ribs 5 of the inner container 1 are matched and sleeve correspondingly, such that the inner container and the housing are correspondingly fixed.

A baffle piece 8 is covered on each of the two food feeding holes 6 on the housing 1; the baffle pieces 8 are made of a flexible material; each of the baffle pieces 8 is further provided with a funnel-shaped food feeding port 9 configured to feed the food to each of locating pipes 5.

The calibre of each of the food feeding ports 9 is smaller than the pet food; under a condition in which the food feeding ports 9 do not become large due to extrusion of an external force, the pet food cannot enter the inner container 2 via the food feeding ports 9. In this sense, the food is placed very conveniently and cannot be leaked from the food feeding ports 9 easily. Moreover, the smell of the food in the inner container 2 can be given off sequentially via the locating pipes 5, and the food feeding ports 9 on the baffle pieces 8 such that the pet is more interested in the toy.

As an optimized solution, the inner container 2 consists of an upper inner container 11 and a lower inner container 13; the upper inner container 11 and the lower inner container 13 are connected via a clamping buckle to form the inner container 2. The housing 2 is also formed by an upper housing and a lower housing by buckling one another. Specifically, a splicing connection manner may be adopted.

The window 15 is arranged at a junction of the upper and lower inner containers 11, 13 and is spliced by upper gaps 12 and lower gaps 14 at the edges of the upper and lower inner containers.

As an optimized solution, the window includes an adjustment baffle plate 10; an upper groove 16 opened downward is formed on the upper inner container 11; a lower groove 17 opened upward is formed on the lower inner container 13; the upper and lower grooves 16, 17 are formed into groove positions for mounting the adjustment baffle plate 10; the upper end of the adjustment baffle plate 10 is inserted into the upper groove 16, and the lower end of the adjustment baffle plate 10 is inserted into the lower groove 17; by moving the adjustment baffle plate 10 in the groove positions, the degree of blockage of the adjustment baffle plate 10 to the window 15 can be controlled. In the process when the disclosure rolls, the food in the inner container 2 is leaked via the window.

Specifically, one end of the adjustment baffle plate 10 is provided with a convex rib 18; a plurality of toothed fillets 19 arranged at intervals and in sequence are provided in a groove body of the inner container 2; the convex rib 18 is matched with the toothed fillets 19 in a groove shape, thereby forming a shift in the process when the adjustment baffle plate 10 is pulled.

When the convex rib 18 is caught in some toothed fillet 19, opposite positions of the adjustment baffle plate 10 and the window 15 are fixed, the adjustment baffle plate 10 is pushed, the convex rib 18 on the adjustment baffle plate 10 is squeezed such that the convex rib 18 is deformed, and thus the convex rib 18 is separated from the toothed fillet 19. When the convex rib 18 is caught in other toothed fillets 19, the adjustment baffle plate 10 is not pushed, the relative positions of the adjustment baffle plate 10 and the window 15 are fixed again, the degree of the blockage of the adjustment baffle plate 10 to the window 15 can be controlled via the above operation and the food-leaking speed can be adjusted. The pet owner can control the degree of blockage of the adjustment baffle plate 10 to the window and makes the toy adapt to different pets or different stages of the pet. When the pet owner goes out for a relatively long time, the window can be adjusted to be smaller, the food inside is not consumed so quickly and the pet may play longer.

A handle 20 is further arranged on the adjustment baffle plate 10, and is configured to push and pull the adjustment baffle plate 10 conveniently.

As an optimized solution, the housing 1 is a hollow shell made of an elastic material; the housing 1 and the inner container 2 are made of a transparent material.

Since the housing 1 is the hollow shell made of the elastic material and has certain elasticity, the pet owner can throw out the toy from a certain height and the toy forms elastic jumping on the ground, thereby achieving better interaction with the pet. Furthermore, the elastic material has a good sense of touch, so the pet has better experience when playing and no damage is caused to the pet. Additionally, the housing 1 and the inner container 2 are made of the transparent material, so the pet can see the food inside the inner container 2 and thus the disclosure further can excite the pet from the visual aspect.

As an optimized solution, the cross section of each of the food-leaking holes 3 is of a pentagonal shape. With the pentagonal shape, the housing 1 is more attractive to the pet.

As an optimized solution, a plurality of bump points for grinding teeth of the pet are arranged on the surface of the housing 1.

As an optimized solution, the housing 1 and the inner container 2 are of a spherical shape easy for rolling.

The adhesion ways between the upper housing and the lower housing vary due to different materials. When the upper housing and the lower housing are made of a silicone rubber, they can be adhered via glue. When the upper housing and the lower housing are made of a thermoplastic elastomer material such as TPR, they also can be adhered via the glue.

Figure 1:
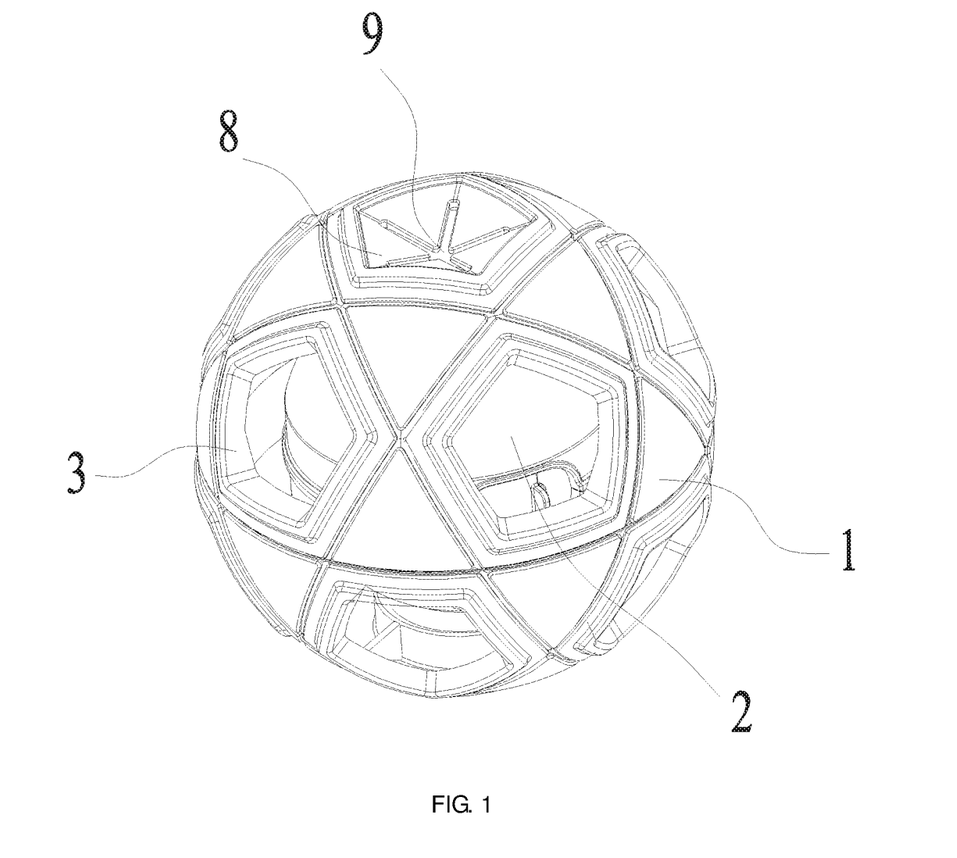
FIG. 1 is an isometric view of the disclosure.
Figure 2:
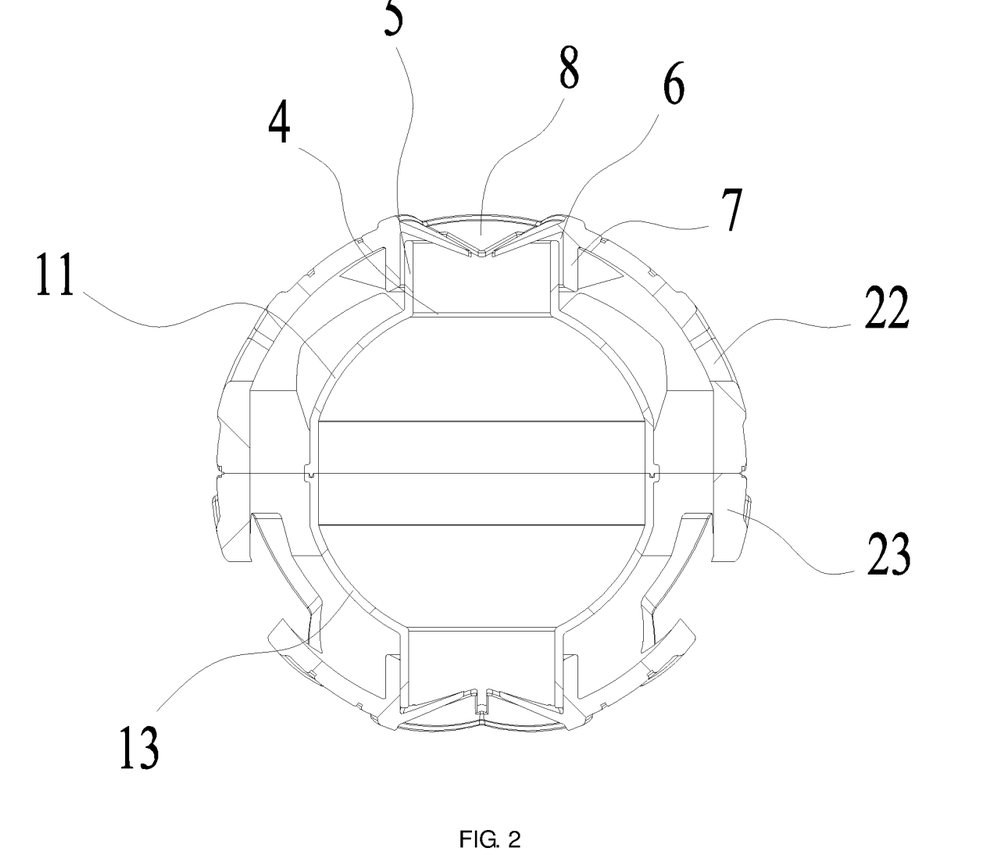
FIG. 2 is a sectional view of the disclosure.
Figure 3:
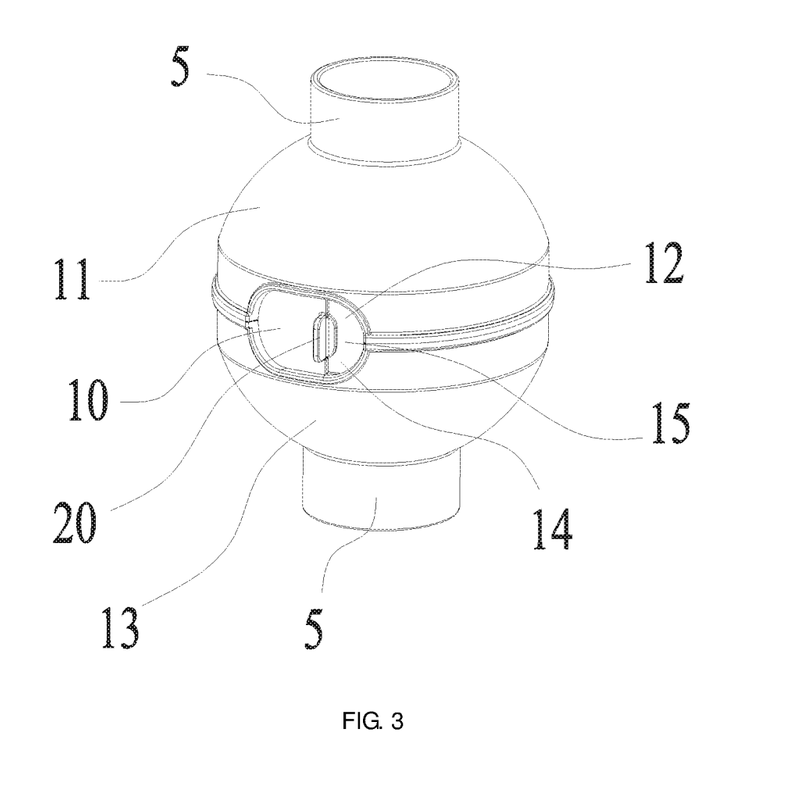
FIG. 3 is an isometric view of an inner container in the disclosure.
Figure 4:
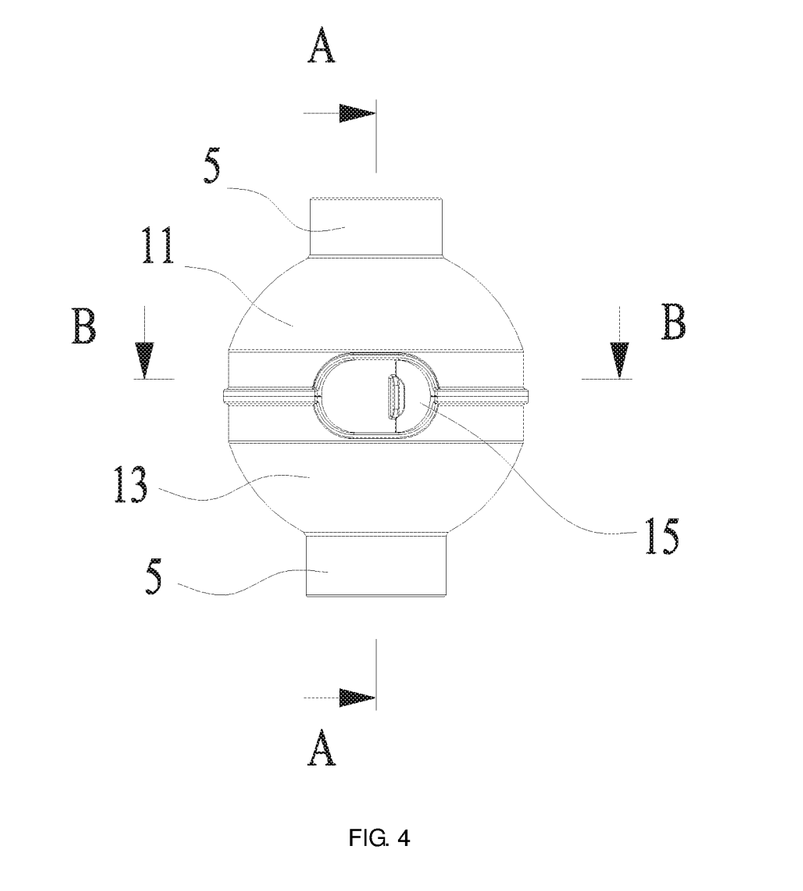
FIG. 4 is a front view of an inner container in the disclosure.
Figure 5:
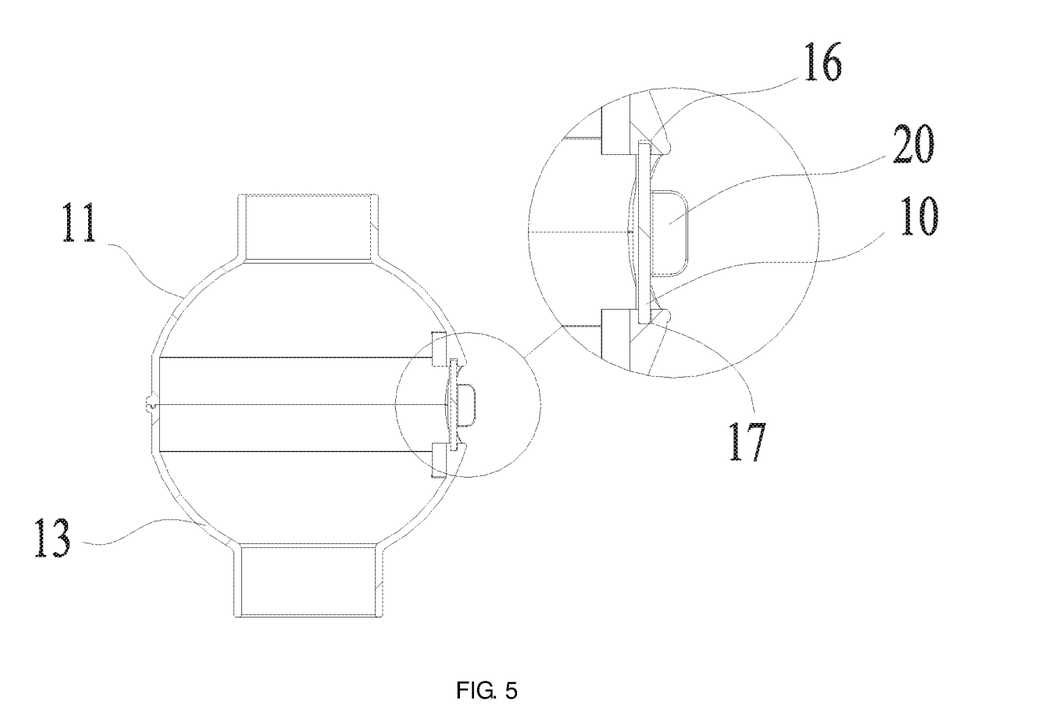
FIG. 5 is an A-A sectional view of FIG. 4.
Figure 6:
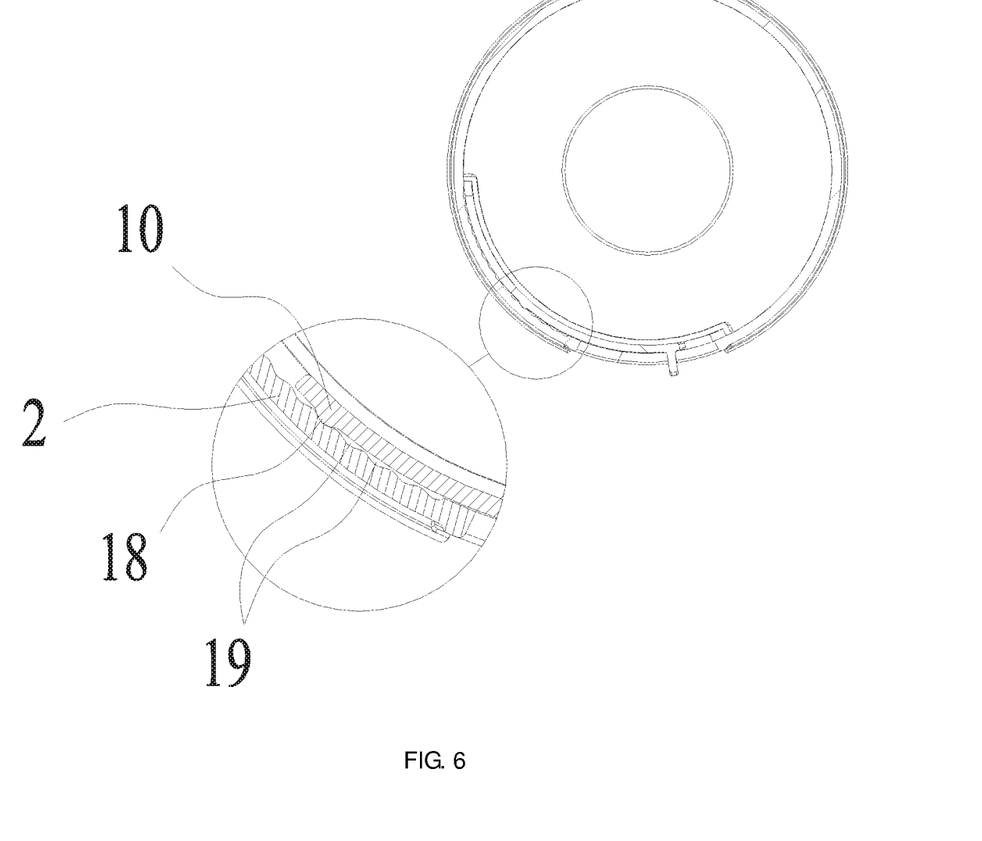
FIG. 6 is a B-B sectional view of FIG. 4.
Figure 7:
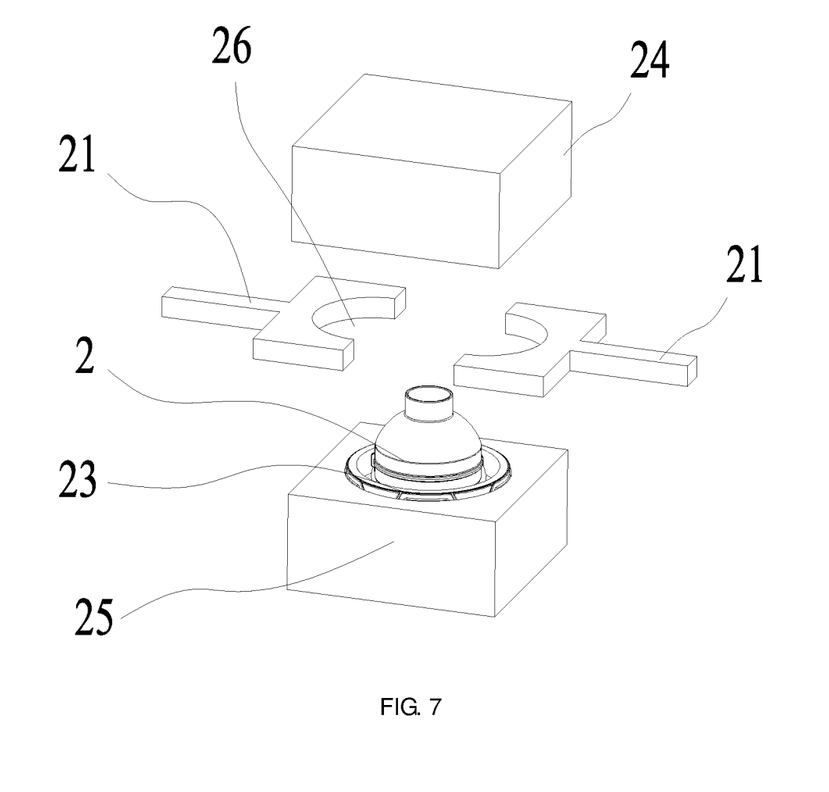
FIG. 7 is an isometric view of a heat seal manner.
Figure 8:
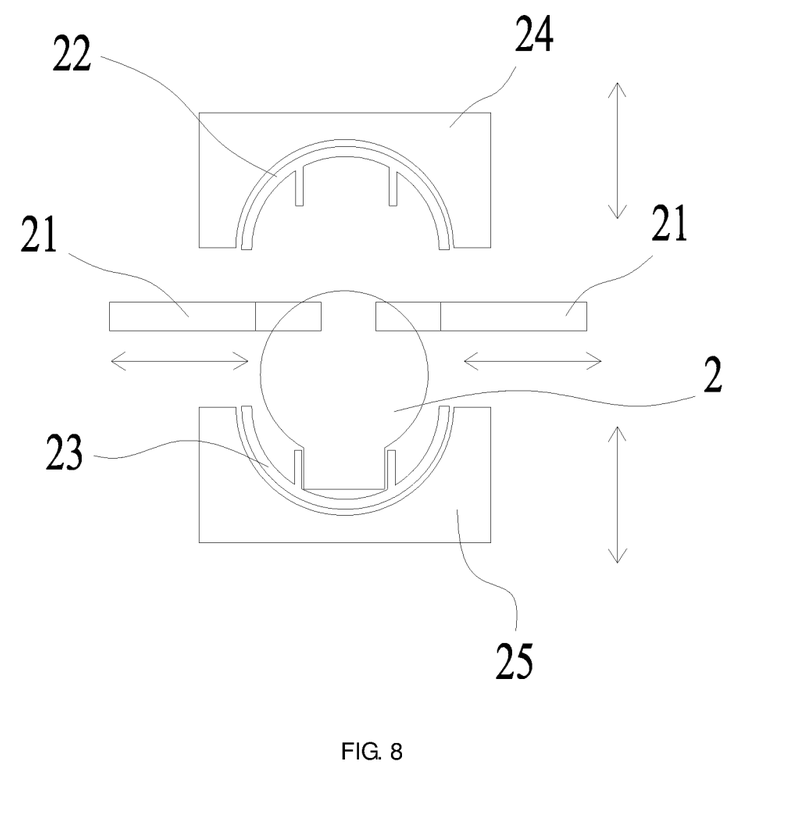
FIG. 8 is a structural systematic diagram of a heat seal manner.

In order to further improve the production efficiency and the adhesion strength, a heat seal manner further may be adopted by the disclosure. The adhesion surfaces of the upper housing 22 and the lower housing 23 are molten via heating plates 21 and are pressurized via a pressure, thus achieving the adhesion on a molecular level. For the product adhered in such a way, the surface is beautiful and the adhesion is firm. The heat seal manner adopts the heat seal of the machine and the moulds. Each of the moulds is composed of an upper mould 24 and a lower mould 25; the upper housing 22 and the lower housing 23 are provided with the corresponding moulds. Specifically, the upper housing 22 corresponds to the upper mould 24; the lower housing 23 corresponds to the lower mould 25. In production, the upper housing 22 and the lower housing 23 are respectively put into the corresponding moulds and the moulds can be directly moved away up and down or left and right. Two heating plates 21 are provided; a hole 26 is formed in the middle of each of the plates; the holes 26 are slightly larger than the inner container 2; the heating plates 21 can be heated to a temperature required to melt the upper housing 22 and the lower housing 23; and the heating plates 21 can be moved away up and down or left and right. First of all, the inner container 2 is placed at the ribs inside the lower housing 23, the upper mould 24 and the lower mould 25 are taken together after the inner container 2 is fixed and the two heating plates 21 are taken together, and the heating plates 21 melt the adhesion surfaces of the upper housing 22 and the lower housing 23; then, after the upper mould 24 and the lower mould 25 are separated, the two heating plates 21 are separated again; and at last, the upper mould 24 and the lower mould 25 are taken together again; since the adhesion surfaces of the upper housing 22 and the lower housing 23 are molten due to the temperature and there generates molecular communication therebetween, the upper housing 22 and the lower housing 23 are adhered together. Compared with the glue adhesion, the efficiency is higher and the automatic production can be implemented. Moreover, the glue is not used and the fusion of the product in itself is utilized, so the toy is more environment-friendly and the adhesion is firmer.

The above embodiments only are several implementation manners of the disclosure and the description is relatively specific and detailed and cannot be understood as the limitation to the scope of protection of the utility mode. It is to be noted that those of ordinary skill in the art further may make a plurality of alternations and improvements without departing from the concepts of the disclosure and all pertain to the scope of protection of the disclosure. Therefore, the scope of protection of the disclosure shall be subjected to the appended claims.

What is claimed is:
1. An adjustable hollow food-leaking toy, comprising: a housing and an inner container, wherein
the inner container is a hollow shell made of a hard material and is configured to accommodate a food eaten by a pet;

a window configured to leak the pet food is formed on the sidewall of the inner container; the opening degree of the window can be adjusted;

the housing is a hollow shell and is configured to hold the inner container; a space for moving the pet food is provided between the housing and the inner container; and food-leaking holes for leaking the pet food are formed on the sidewall of the housing;

wherein a food eating hole is respectively formed at two ends of the inner container;

a locating pipe communicating with a cavity of the inner container via each of the food eating holes is further respectively arranged at the two ends of the inner container;

a food feeding hole is respectively formed at two ends of the housing;

a raised fillet communicating with each of the food feeding holes is further respectively arranged at the two ends of the housing;

the two locating pipes and the two raised fillets are spliced correspondingly such that the housing and the inner container are fixed mutually;

a flexible baffle piece is covered on each of the two food feeding holes on the housing; each of the flexible baffle pieces is further provided with a food feeding port configured to feed the food to each of the locating pipes;

wherein the inner container consists of an upper inner container and a lower inner container buckled oppositely;

the window comprises an adjustment baffle plate; upper and lower grooves are formed at upper and lower edges of the window or adjacent to the upper and lower edges of the window; the upper and lower grooves are formed into a groove space;

the window is arranged at a junction of the upper and lower inner containers and is spliced by edge gaps of the upper and lower inner containers; toothed fillets are arranged on the groove space; the adjustment baffle plate is provided with a convex rib; the convex rib is matched with different toothed fillets in a concave-convex manner to change different gear in a process when the adjustment baffle plate is pushed.

2. The adjustable hollow food-leaking toy according to claim 1, wherein the upper inner container and the lower inner container are formed into a whole via ultrasonic welding, buckling or screw connecting; the housing consists of an upper housing and a lower housing that are buckled and are connected mutually.

3. The adjustable hollow food-leaking toy according to claim 2, wherein the adjustment baffle plate is spliced in the groove space and can be skid left and right.

4. The adjustable hollow food-leaking toy according to claim 3, wherein the adjustment baffle plate is provided with an adjustment handle; the adjustment handle is configured to push the adjustment baffle plate left and right to adjust the opening size of the window.

5. The adjustable hollow food-leaking toy according to claim 2, wherein the upper housing and the lower housing of the housing are combined in an adhesive manner.

6. The adjustable hollow food-leaking toy according to claim 1, wherein the housing is a light pervious body, or both the inner container and the housing are the light pervious bodies.

* * * * *